United States Patent [19]

Chikuma et al.

[11] Patent Number: 4,730,687
[45] Date of Patent: Mar. 15, 1988

[54] STEERING FORCE CONTROL DEVICE FOR POWER STEERING SYSTEM

[75] Inventors: Isamu Chikuma; Hiroshi Eda, both of Maebashi, Japan

[73] Assignee: Nippon Seiko Kabushiki Kaisha, Tokyo, Japan

[21] Appl. No.: 813,665

[22] Filed: Dec. 26, 1985

[30] Foreign Application Priority Data

| Dec. 26, 1984 | [JP] | Japan | 59-273427 |
| Mar. 27, 1985 | [JP] | Japan | 60-60996 |
| Jul. 5, 1985 | [JP] | Japan | 60-146698 |
| Jul. 26, 1985 | [JP] | Japan | 60-113801 |
| Nov. 21, 1985 | [JP] | Japan | 60-178295 |

[51] Int. Cl.⁴ .................................. B62D 5/08
[52] U.S. Cl. ....................... 180/142; 91/375 A; 91/434; 180/143
[58] Field of Search ............. 180/140, 141, 142, 143, 180/29.1; 364/424; 74/388 PS; 91/375 A, 434; 137/625.65, 625.64, 625.66

[56] References Cited

U.S. PATENT DOCUMENTS

| 3,939,938 | 2/1976 | Inoue | 180/142 |
| 4,310,063 | 1/1982 | Nishikawa | 180/143 |
| 4,410,059 | 10/1983 | Nakayama et al. | 180/143 |
| 4,557,342 | 12/1985 | Drutchas | 180/142 X |
| 4,593,783 | 6/1986 | Honaga et al. | 180/141 |
| 4,601,358 | 7/1986 | Kozuka et al. | 180/141 |
| 4,606,424 | 8/1986 | Hasegawa | 180/143 |
| 4,619,339 | 10/1986 | Futaba et al. | 91/375 A X |
| 4,621,703 | 11/1986 | Breitweg | 180/143 |
| 4,621,704 | 11/1986 | Kozuka | 91/375 A X |
| 4,625,624 | 12/1986 | Adams | 91/375 A |
| 4,632,204 | 12/1986 | Honaga et al. | 180/142 |
| 4,633,963 | 1/1987 | Hasegawa | 180/143 |
| 4,637,484 | 1/1987 | Ijiri et al. | 91/434 X |

FOREIGN PATENT DOCUMENTS

| 31427 | 3/1977 | Japan | 180/143 |

*Primary Examiner*—John J. Love
*Assistant Examiner*—Mitchell J. Hill
*Attorney, Agent, or Firm*—Arnold S. Weintraub

[57] ABSTRACT

A working fluid passage supplying a fixed flow rate is divided into passages so that a flow rate ratio between the two passages is varied by a variable orifice valve based on a detection signal of a physical quantity factor which varies depending on travelling and steering conditions of the vehicle. The working fluid from one of the two passages is supplied to a steering assisting force generating mechanism through a changeover valve which changes over the passages in accordance with a direction of steering torque acting on the input shaft steering the vehicle, to generate the steering assisting force. The working fluid from the other passage is supplied to a steering reaction force generating mechanism through the changeover valve, and by generating the steering reaction force to the input shaft, the steering force is controlled to an adequate condition corresponding to the physical quantity factor. Furthermore, the passage of the variable orifice valve at the side of the steering reaction force generating mechanism is connected to a drain through a changeover valve or a pressure regulating valve to thereby control the steering feeling to a more adequate condition, and at the same time, when the vehicle is travelling at a low speed, the generation of the steering reaction force by the steering reaction force generating mechanism is suppressed, or the steering reaction force of the steering reaction force generating mechanism is maintained at a constant value. Moreover, the steering angle ratio is regulated by rotating the input shaft in the same direction as the steering direction by a steering angle ratio varying mechanism in correspondence with the reaction force of the steering reaction force generating mechanism, and thus optimum steering feeling can be obtained. Further, a change in the exciting current due to an internal resistance change of an electromagnetic solenoid is suppressed by a voltage correction circuit provided in a control unit for controlling the electromagnetic solenoid of the variable orifice valve, and an appropriate steering force can be generated.

22 Claims, 24 Drawing Figures

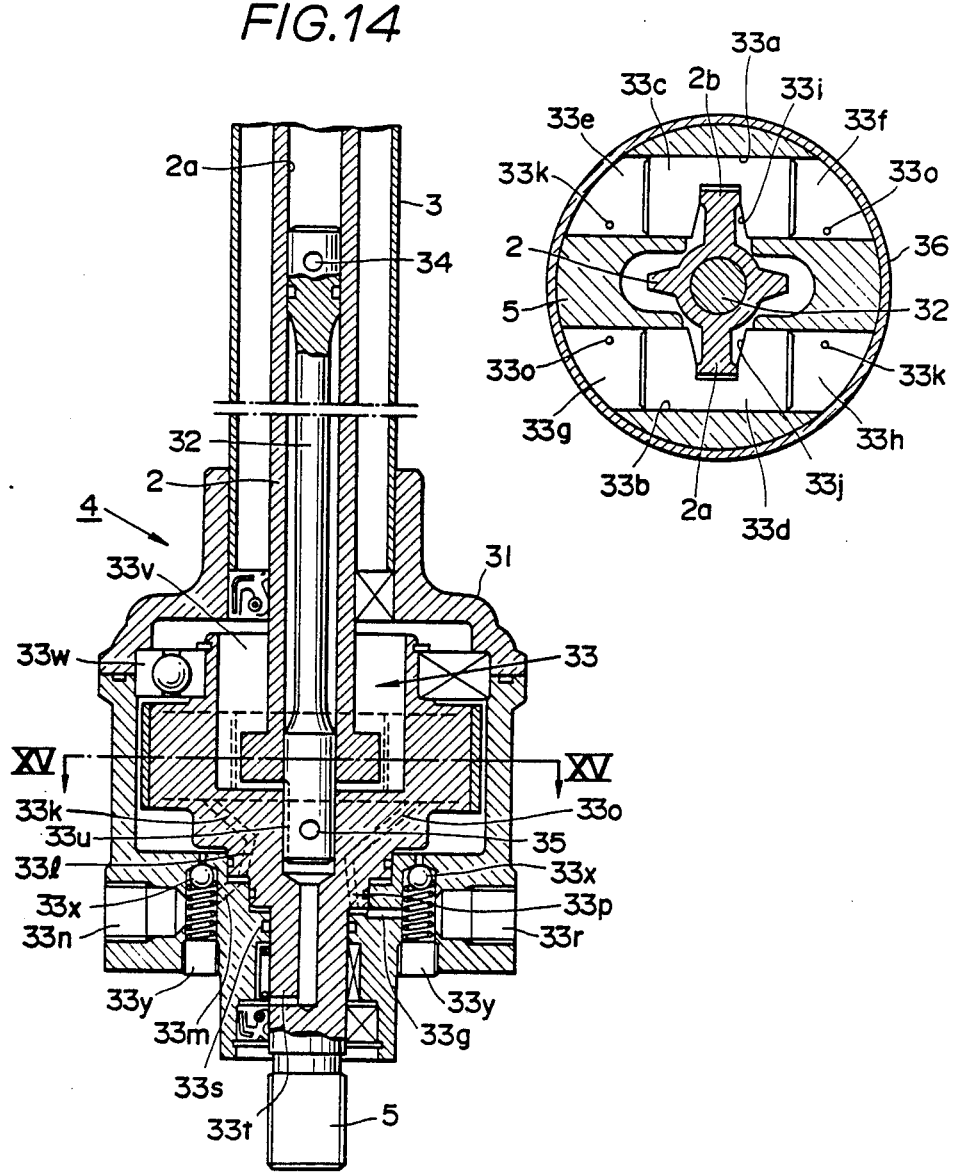

STEERING FORCE CONTROL DEVICE FOR POWER STEERING SYSTEM

BACKGROUND OF THE INVENTION

1. Field of the Invention

The present invention relates to a steering force control device of a power steering system in which a steering assistance force and a steering reaction force are generated in correspondence with the steering torque acting on an input shaft for steering a vehicle, and a physical quantity factor, which varies depending on a travelling condition of the vehicle and on a steering condition, is detected, and steering feeling is varied in accordance with a change in the physical quantity. In particular, the present invention relates to a steering force control device of a power steering system in which the appropriate steering feeling is made by changing any one of the steering assistance force, steering reaction force, and steering angle ratio in accordance with the physical quantity factor.

2. Description of the Prior Art

In prior art power steering systems, generally, there are relatively no problems at low vehicle speeds. However, problems are encountered in high speed running, or at a large steering angle in that the driver tends to become uneasy since the steering force is too light even when a physical factor, which depends upon the vehicle running condition and the steering condition, is increasing. Power steering systems which have been developed to solve this problem attempt to vary the input and output characteristics (relationships between various factors and an input shaft steering force) in accordance with the physical factors. These systems have been generally divided into the following types, including: a flow rate control type as disclosed, for example, in Japanese Patent Publication No. 54-5571 (1979), wherein a flow rate of fluid supplied to the steering system is controlled in accordance with the physical quantity factor; a steering reaction force control type as disclosed, for example, in Japanese Patent Publication No. 49-29653 (1974), wherein a reactive hydraulic pressure produced by detecting the physical quantity factor is made to act directly on the input shaft as a control force such as a couple of forces; and a steering angle ratio control type as disclosed, for example, in U.S. Pat. No. 4,310,063 wherein a variable steering angle ratio is obtained by interposing resilient means which provides a rotational displacement in a range of a substantially linear spring constant.

Further, in a flow rate control type of power steering system wherein the flow rate of the fluid is controlled by actuating an electric-hydraulic pressure converter in accordance with the detected physical quantity factor, there is a problem in that, when an electromagnetic solenoid is used as the electric-hydraulic pressure converter, the flow rate of the fluid is varied depending on a temperature change of the electromagnetic solenoid, and thus proper steering failure cannot be obtained.

In order to solve this problem, for example, as described in Japanese Patent Publication Nos. 54-11047 and 55-4394, an electrical type of control has been proposed to obtain an adequate steering reactive hydraulic pressure by adjusting an energizing current supply rate to the electric-hydraulic pressure converter in accordance with a control signal corresponding to a vehicle speed. In this case, a voltage drop or a load current in the electric-hydraulic pressure converter is detected, and this detected signal is supplied as a feedback signal to a differential amplifier to which a predetermined reference voltage or a vehicle speed detection signal is being supplied, thereby to eliminate the influence due to a large variation in the internal resistance of the electric-hydraulic pressure converter caused by the temperature change, or due to a variation in the power supply voltage.

However, in the prior art flow rate control type, although there is an advantage that a control mechanism is relatively simple and is easily applicable to other usual power steering systems, a drawback is also present in that the steering force of the input shaft is not increased to a great extent even when the flow rate is varied in accordance with a variation in the physical quantity factor.

Furthermore, in the steering reaction force control type, a range of the input and output characteristics can be made wide, however, on the other hand, there is a problem in that since it is required to introduce a reactive hydraulic pressure from outside and further to convert this hydraulic pressure to a direct control force, the structure tends to be complicated. Moreover, since a special pressure is applied to the input shaft for controlling a normal steering force at the time of high speed running or at the time when the physical quantity factor is increased, a variation in the pressure is abrupt, and additional energy is consumed due to this variation, which poses a problem in view of the efficiency of the fuel consumption.

In addition, in the steering angle control type, in order to make the steering angle ratio large, it is necessary to set the spring constant of a torsion bar low to permit a large torsional angle at the resilient means. As a result, there arises a problem in that the torsional rigidity of the torsion bar is reduced, and the steering feeling for the steering system as a whole is degraded.

Further, the electrical control type is constructed to control, in accordance with the magnitude of a current, the electromagnetic force of the electromagnetic solenoid in the electric-hydraulic pressure converter which generates the hydraulic pressure corresponding to the vehicle speed. In this type of control, when the vehicle is running the current is consistently supplied to the electromagnetic solenoid, and heat generation in an output transistor which performs the control is increased, and thus there is a problem in that the reliability of semiconductor device is degraded and a large heatsink is required. As a measure to minimize this drawback, the heat generation of the output transistor is reduced by making the output transistor perform a switching operation and by changing the duty ratio of this transistor in accordance with the vehicle speed. However, in this case, since a pulse width applied to the electromagnetic solenoid is controlled, the amount of the energizing current of the electromagnetic solenoid cannot be detected accurately, and thus it is impossible to modify the control by feeding back the voltage drop caused by the current flowing through the electromagnetic solenoid as in the prior art mentioned above. As a result, there arises a new problem in that it is impossible to prevent the variation in the amount of energizing current due to an internal resistance change which is caused by the temperature change of the electromagnetic solenoid.

OBJECTS OF THE INVENTION

A primary object of the present invention is, in view of the problems in the prior art mentioned above, to provide a power steering system which is relatively simple in construction and which enables a large variation in the input and output characteristics to be obtained, and further which provides a high sensitivity in the steering feeling and relatively low energy consumption.

Another object of the present invention is to provide a power steering system capable of generating adequate steering feeling without degradation of the steering feeling when the reactive hydraulic pressure is excessively high, and capable of improving the durability.

Still another object of the present invention is to provide a power steering system which enables the steering angle ratio to be reduced when the vehicle is stopping, or running at low speeds, and at the same time, to increase the steering angle ratio when the vehicle is running at high speeds, without reducing the torsional rigidity of the resilient body, and which enables the steering feeling to be improved.

Still another object of the present invention is to provide a power steering system which enables adequate steering feeling to be obtained by effectively suppressing a variation in the magnitude of energizing current due to a temperature change of the electromagnetic solenoid while controlling the electromagnetic solenoid with a pulse width control, wherein the solenoid drives a control valve for controlling the steering assisting force in the power steering systems.

SUMMARY OF THE INVENTION

The present invention includes sensor means for detecting a physical quantity which varies depending on a running condition and a steering condition of the vehicle, and in accordance with a control signal from a control unit which determines an optimum steering force by processing a signal from the sensor means, a passage which supplies a constant flow rate is divided into two passages including a steering resistance passage having a control plunger in engagement with an input shaft, and an energizing passage having an energizing cylinder, and the degree of opening of variable orifices respectively disposed in the two passages are regulated, and a relative ration between the flow rates of respective passages is varied according to varying pressures in the respective passages thereby to control the steering force of the input shaft. Consequently, although the construction is relatively simple as compared with the prior art systems, in the present invention, a range of the input and output relationship (a relationship between the varying physical quantity and the input shaft steering force) can be made wide. Moreover, since a discharge flow rate from a pump supplying a constant flow rate is distributed to two passages in accordance with the degree of opening of a variable orifice valve so that the sum of two passage areas is equal to a constant value or more, there is no need to always exert high pressure to the input shaft as is the case in the prior art system, and further, even when the travelling speed of the vehicle is changed, the pressure in the supply side when the steering wheel is at the straight-travelling position rarely becomes high, and the vehicle can travel at a relatively low constant pressure. As a result, wasteful loss of energy can be saved, and the energy efficiency can advantageously be improved. Moreover, by setting a higher pressure-sensitivity (the degree of pressure change with respect to a relative displacement of the valve) on a steering resistance valve which provides a steering resistance than that of a rotary valve which exerts a steering force, the pressure-sensitivity to the steering angle of the whole steering system is enhanced during high speed running of the vehicle (when the flow rate flowing to the steering resistance valve is large), and the pressure-sensitivity to the steering angle of the whole steering system is lowered during low speed running of the vehicle (when the flow rate flowing to the rotary valve is large). Thus, it is possible to obtain sensitive feeling with quick reaction during high speed running and relatively slow and loose feeling during low speed running.

Furthermore, by providing a flow control valve between the steering resistance passage of the variable orifice valve and the drain, and by associating the opening and closing of the flow control valve with the degree of opening of the variable orifice, it is possible to quickly return the fluid remaining in a pressure chamber which actuates the control plunger to the tank, and thus the control of the steering force can be smoothly achieved over a wide range.

Further, by providing a pressure regulating mechanism between the steering resistance passage of the variable orifice valve and the drain, it is possible to prevent the generation of an excessively large steering reaction force in the steering reaction force generating mechanism, and by virtue of this, the durability can be improved, and at the same time, the steering feeling can be maintained in an adequate condition.

Still further, by providing a positive rotational displacement in a steering direction to the input shaft, i.e., to the resilient body in a rotational displacement generating section of a steering angle ratio varying mechanism, and by utilizing a reaction force of a steering reaction force generating mechanism which generates the steering reaction force in the opposite direction to the steering force, a torsional angle of the resilient body can be controlled in the rotational displacement generating section, and by this, it becomes possible to select a large value of the torsional rigidity of the resilient body. As a result, an optimum steering feeling can be obtained throughout the whole range from a low speed travelling condition to a high speed travelling condition.

Further, by correcting a pulse width modulation signal of a pulse width modulation circuit which converts a detection signal of a physical quantity detecting sensor to a pulse width modulated signal, and by voltage correction means performing a voltage correcting corresponding to an internal resistance change of the electromagnetic solenoid, it is possible to compensate for the internal resistance change of the electromagnetic solenoid cause by an exciting current change, based on the detection signal of the physical quantity detecting sensor, and to make the electromagnetic force of the electromagnetic solenoid accurately follow the detection signal of the physical quantity detecting sensor.

BRIEF DESCRIPTION OF THE DRAWINGS

FIG. 14 is a longitudinal cross-sectional view of a steering angle varying mechanism;

FIG. 15 is a cross-sectional view taken along the line XV—XV in FIG. 14;

DESCRIPTION OF THE PREFERRED EMBODIMENT

Embodiments of the present invention will be described hereinafter with reference to the drawings.

Figure 1:
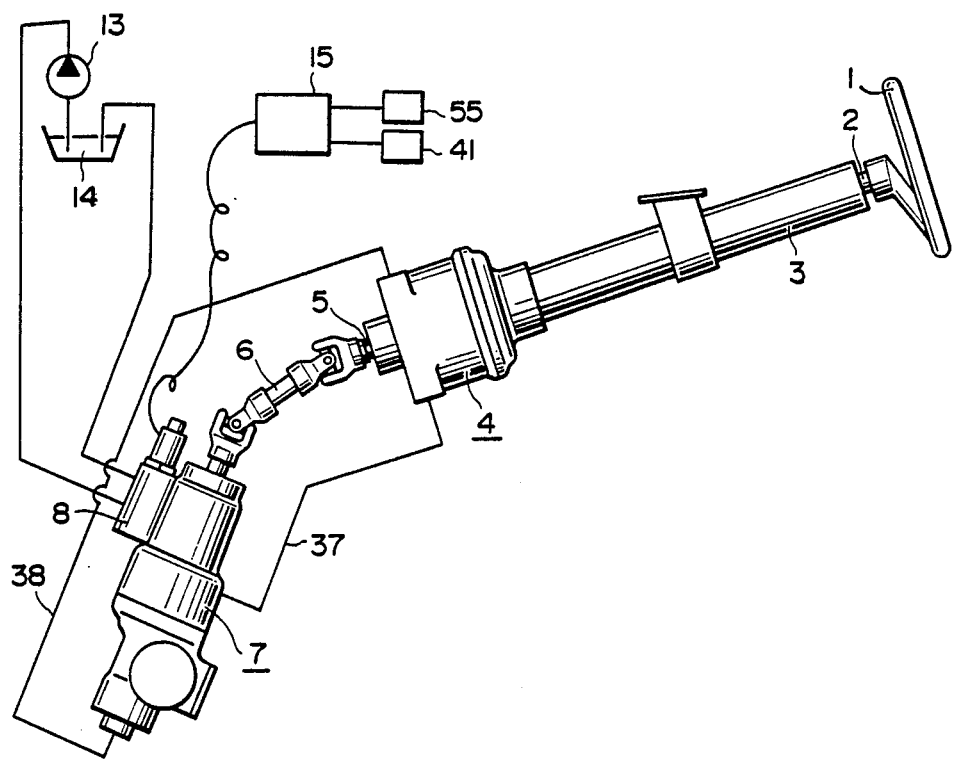
FIG. 1 is a schematic view showing a general configuration of the present invention.

FIG. 1 shows an overall configuration of one embodiment of the present invention.

In FIG. 1, reference number 1 designates a steering wheel, and a steering shaft 2 serving as an input shaft and having one end connected to the center portion of the steering wheel 1 passes through a column tube 3, and is connected at the other end to a steering angle ratio varying mechanism 4. An output shaft 5 of the steering angle ration varying mechanism 4 is connected via a universal joint 6 to a variable steering force power steering device 7.

Figure 2:
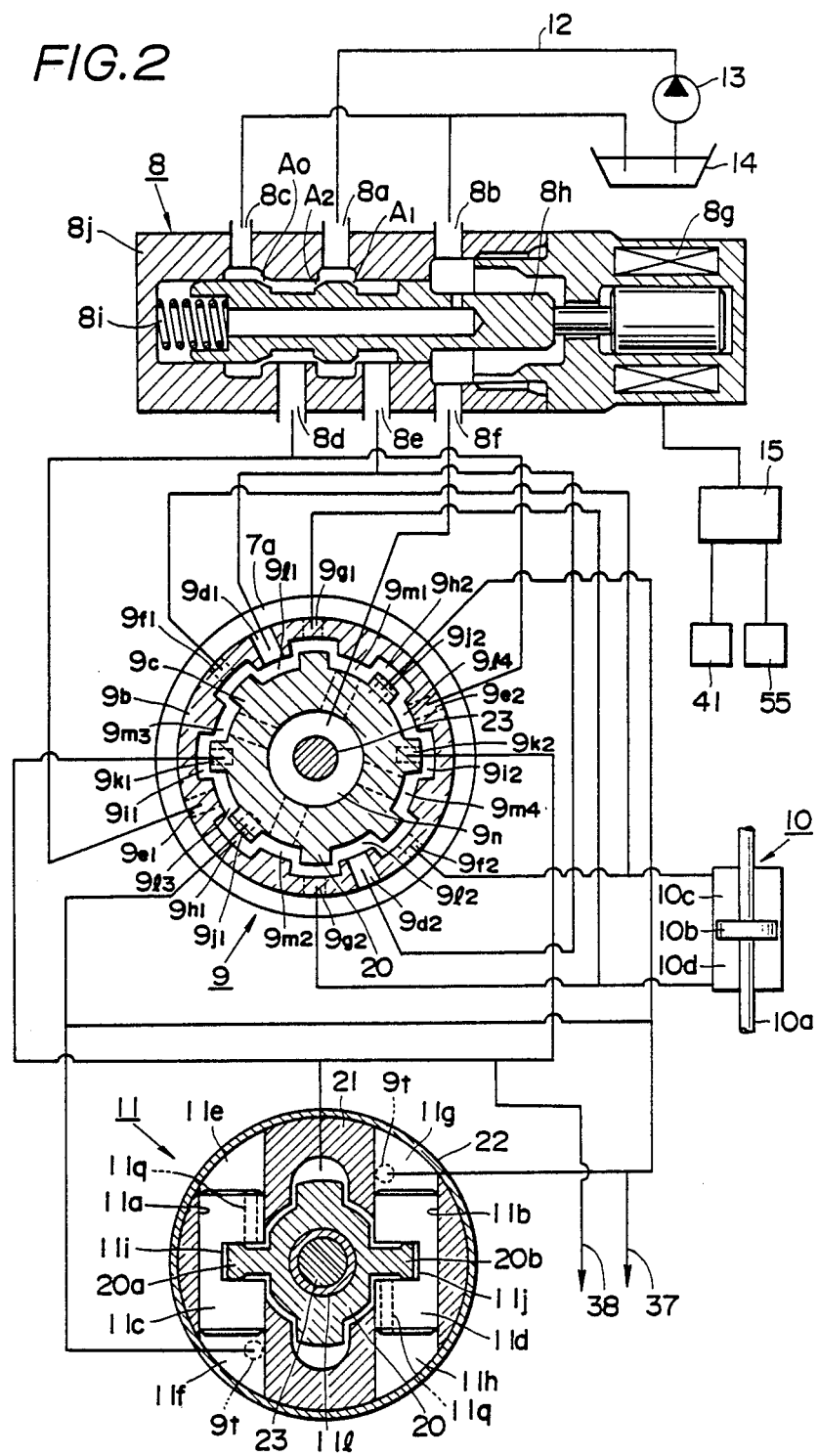
FIG. 2 is a cross-sectional view of a variable steering force power steering device including a variable orifice valve, a rotary changeover valve (taken along the line II—II in FIG. 3), and a steering reaction force generating mechanism (taken along the line III—III in FIG. 3), and showing connection relationships therebetween.
Figure 3:
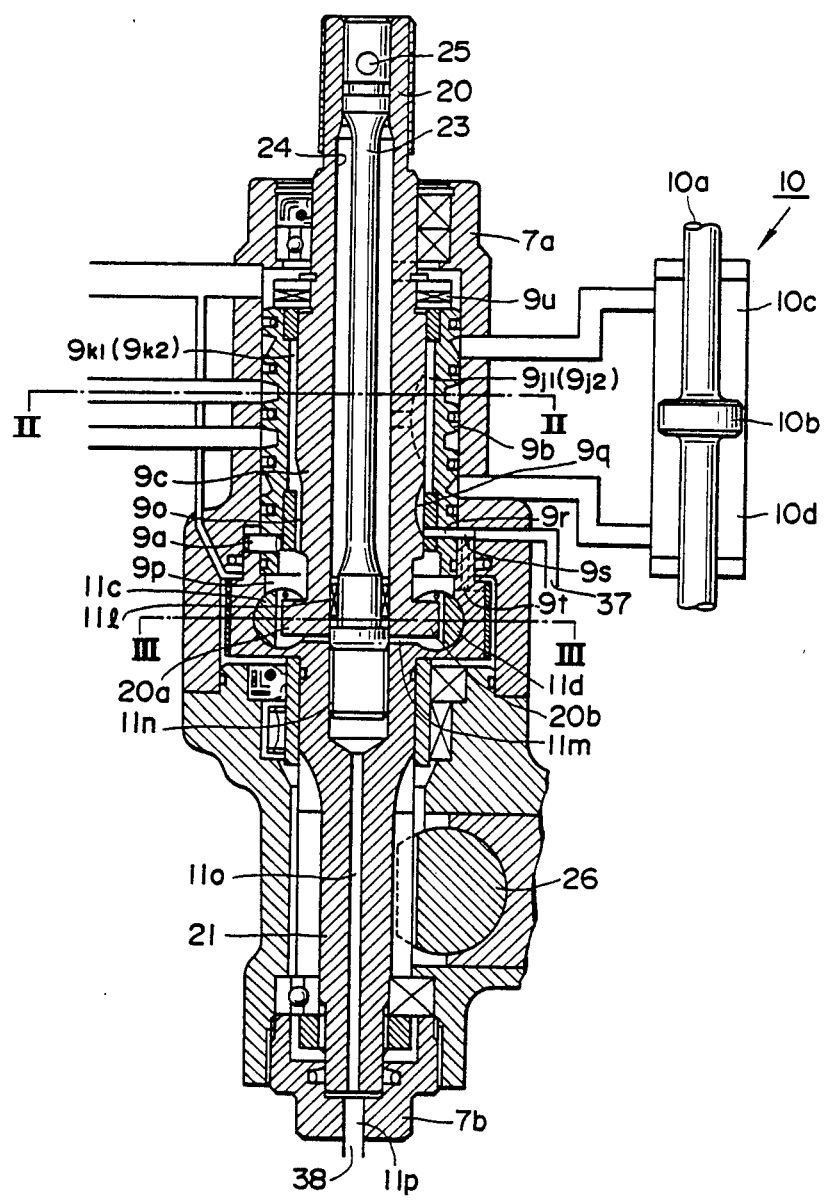
FIG. 3 is a longitudinal sectional view of the variable steering force power steering device.

The variable steering force power steering device 7, as shown in FIGS. 2 and 3, comprises a variable orifice valve 8, a rotary changeover valve 9 also referred to as a passage changeover valve, a power cylinder 10 also referred to as a steering assisting force generating mechanism, and a steering reaction force generating mechanism 11.

The variable orifice valve 8 comprises a solenoid operated spool valve having a valve housing 8j formed with an input port 8a connected through a passage 12 to a pump 13 which discharges a constant flow rate; drain ports 8a and 8c, connected to a tank 14; output ports 8d and 8e of variable flow rate; a return port 8f; a spool 8h mounted slidably within the valve housing 8j and controlled by an electromagnetic solenoid 8g with respect to a sliding position; and a return spring 8i. The spool 8h is moved in proportion to a current valve supplied to the electromagnetic solenoid 8g. While the spool 8h is a neutral condition as shown in FIG. 2, the input port 8a is in communication with the output ports 8e and 8d respectively through variable orifices $A_1$ and $A_2$ which maintain a predetermined degree of opening, and the return port 8f is in communication with the drain port 8b. From this condition, when the amount of energizing current to the electromagnetic solenoid 8g is increased (or decreased), the spool 8h moves to the left (or right), and an communicating area of the output port 8e (or 8d) with respect to the input port 8a is increased, and a communicating area of the other output port 8d (or 8e) with respect to the input port 8a is increased, and a communicating area of the other output port 8d (or 8e) is decreased, resulting in the sum of both communicating areas always being equal to or greater than a constant value. Further, when the communicating area of the output port 8d with respect to the input port 8a is decreased, correspondingly, the output port 8d and the drain port 8c are in communication with each other through a variable orifice $A_o$ constituting an opening and closing valve, and hydraulic fluid supplied to the output port 8d is returned to the tank 14 through the drain port 8c.

Figure 5:
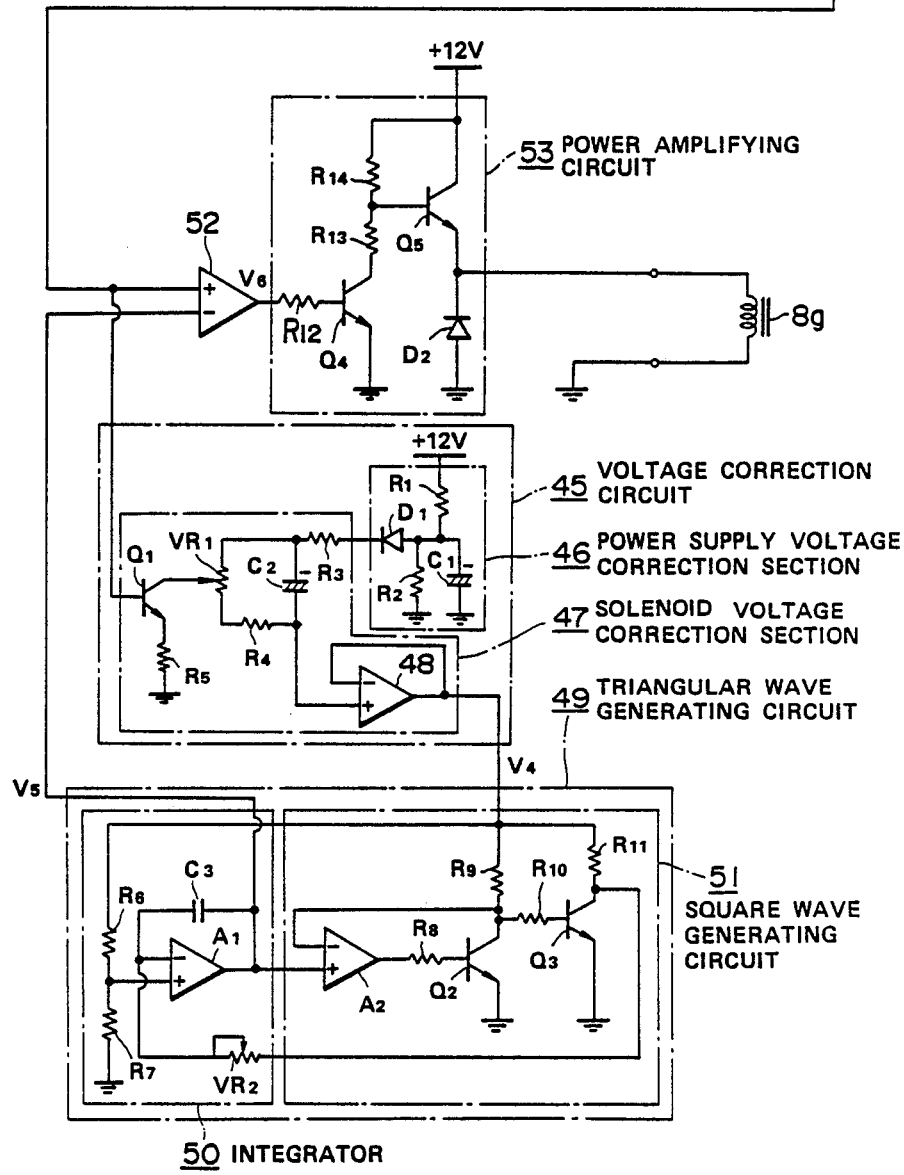
FIG. 5 is an electric circuit diagram showing an example of the control unit.

The electromagnetic solenoid 8g is controlled by a driving current from a control unit 15. An example of this control unit 15 is shown in FIG. 5.

More specifically, a vehicle speed sensor 41, comprising detecting means, such as a tachogenerator or its equivalent, for detecting a physical quantity change due to a variation in a running condition of the vehicle, generates a sinusoidal detection signal which is supplied to a waveform shaping circuit 42 including a half-wave rectifier circuit. The sinusoidal signal is converted to a pulse signal, and the pulse output is supplied to a pulse width regulating circuit 43 such as a monostable circuit or the like, and is regulated to a constant pulse width.

Figure 7:
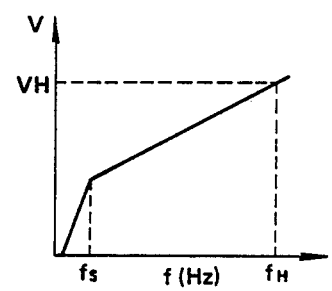
FIG. 7 is a graph showing a relationship between a frequency and a voltage in a frequency-voltage converting circuit.

The output of the pulse width regulating circuit 43 is supplied to a frequency-voltage converting circuit 44, and is converted to a voltage signal associated with a predetermined characteristic. In this case, the relationship between the frequency and the voltage is, as shown in FIG. 7, selected to have two or more lines with different gradients, such that a low frequency region below a predetermined set frequency fs which corresponds to a low vehicle speed condition, has a voltage change with respect to frequency change that is large, and such that a high frequency region exceeding the predetermined set frequency fs which corresponds to a high vehicle speed condition, has a voltage change with respect to the frequency change that is small. The relationship between the voltage and the frequency is selected as mentioned above because, when the vehicle is in the low vehicle speed condition, the frictional resistance between the tire and the road surface is large, and under this condition, a large steering force is required to steer with the steering wheel. Accordingly, the steering assisting force is also required to be large, and thus the operating characteristics are required to change between the low vehicle speed condition and the high vehicle speed condition.

A portion of the voltage output from the frequency-voltage converting circuit 44 is supplied to a voltage correction circuit 45 which serves as voltage correcting means. This voltage correction circuit 45 comprises a power supply voltage correction section 46 for correcting a variation in the power supply voltage due to a charged condition of a battery (not shown), and a solenoid voltage correcting section 47 for correcting a variation in the amount of energizing current due to an internal resistance change of the electromagnetic solenoid 8g of the variable orifice valve 8.

The power supply voltage correction section 46 divides a power supply voltage Vcc of +12 V, supplied from the battery by resistors $R_1$ and $R_2$, and smooths the divided voltage by a capacitor $C_1$, outputting through a diode $D_1$ a corrected output which suppresses the variation in the power supply voltage Vcc.

The solenoid voltage correction section 47 comprises a charging and discharging capacitor $C_2$ having one terminal connected to the output side of the power supply voltage correction section 46 through a resistor $R_3$, a series circuit of a variable resistor $VR_1$ and a resistor $R_4$ connected in parallel across the capacitor $C_2$, a transistor $Q_1$ having a base connected to the output side of the frequency-voltage converting circuit 44, and an emitter connected to ground through a resistor $R_5$, and a buffer circuit 48 having a non-inverting input terminal connected to a junction point between the capacitor $C_2$ and resistor $R_4$, and an inverting input terminal connected to the output side of the buffer circuit 48.

The correction voltage $V_4$ outputted from the buffer circuit 48 of the voltage correction circuit 45 is supplied to a triangular wave generating circuit 49.

The triangular wave generating circuit 49 comprises an integrator 50 and a square wave generating circuit 51.

The integrator 50 includes an operational amplifier (hereinafter referred to as OP amp) $A_1$ having a non-inverting input terminal supplied with a voltage obtained by dividing the correction voltage $V_4$ by resistors $R_6$ and $R_7$, an inverting input terminal supplied with an output of the square wave generating circuit 51 through a variable resistor $VR_2$ for frequency regulation, and a capacitor $C_3$ which is connected between the output terminal and the non-inverting terminal of the OP amp $A_1$.

Further, the square wave generating circuit 51 is composed of an OP amp $A_2$ serving as a comparator having a non-inverting input terminal supplied with an integrated output of the integrator 50, and an inverting input terminal supplied with a collector voltage of a transistor $Q_2$ (which will be described later); the transistor $Q_2$ having a base connected to the output side of the OP amp $A_2$ through a resistor $R^8$, a collector connected to the output side of the voltage correction circuit 45 through a resistor $R_9$, and an emitter connected to ground; and a transistor $Q_3$ having a base connected to the collector of the transistor $Q_2$ through a resistor 10, a collector connected to the output side of the voltage correction circuit 45 through a resistor 11, an emitter connected to ground, and the collector voltage of the transistor $Q_3$ connected to the inverting input terminal of the OP amp $A_1$ in the integrator 50 through the frequency regulating variable resistor $VR_2$.

The voltage output of the frequency-voltage converting circuit 44 and a triangular wave voltage from the integrated output of the integrator 50 are supplied to a comparison circuit 52, and a pulse width modulated voltage, which is at a high level during a period when the triangular wave voltage is above the voltage output, is outputted from the comparison circuit 52.

This pulse width modulated voltage is power amplified in a power amplifying circuit 53 and then supplied to the electromagnetic solenoid 8g of the variable orifice valve 8.

The power amplifying circuit 53 comprises a transistor $Q_4$ having a base connected to the output side of the comparison circuit 52 through a resistor $R_{12}$, a collector connected to the battery through resistors $R_{13}$ and $R_{14}$, and an emitter connected to ground; and a transistor $Q_5$ having a base connected to the junction point of the resistors $R_{13}$ and $R_{14}$, a collector connected to the + side of the battery, an emitter connected to ground through a diode $D_2$ which absorbs a surge current of the electromagnetic solenoid 8g, and the junction point between the emitter of the transistor $Q_5$ and diode $D_2$ connected to one end of the electromagnetic solenoid 8g with the other end connected to the ground.

Figure 6:
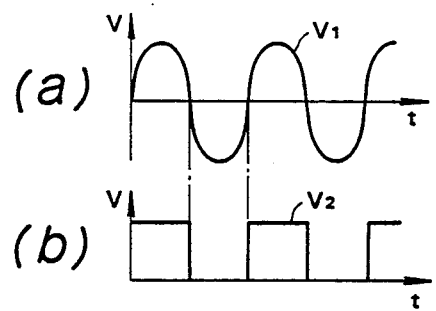
FIG. 6 is a signal waveform diagram useful to explain the operation of the control unit.
Figure 8:
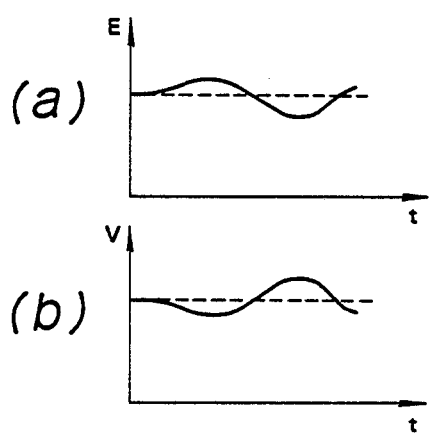
FIG. 8 is a waveform diagram showing a power supply voltage variation and its correction voltage respectively at (a) and (b)

Now, supposing that the vehicle is travelling at a high speed, a sinusoidal wave voltage $V_1$ of a high frequency as shown in FIG. 6, at (a) is outputted from the vehicle speed sensor 41. The sinusoidal wave voltage $V_1$ is half-wave rectified by the waveform shaping circuit 42 to produce a pulse signal $V_2$ as shown in FIG. 6 at (b), and then it is regulated to a constant width in the pulse width regulating circuit 43 and is supplied to the frequency-voltage converting circuit 44. In this frequency-voltage converting circuit 44, since the frequency of the pulse signal inputted thereto is high (for example, at $f_H$ in FIG. 7), the converted output voltage $V_3$ is also a high voltage $V_H$. Since, this output voltage $V_3$ is supplied to the voltage correction circuit 45, the transistor $Q_1$ in the solenoid voltage correction section 47 is in a saturated condition, and thus current from the power supply correction section 46 is bypassed through the collector and emitter of the transistor $Q_1$, and the correction voltage $V_4$ outputted from the buffer circuit 48 is relatively low voltage, being approximately equal to the power supply voltage to the triangular wave generating circuit 49 (which will be described later) when the voltage correction is not carried out. In this case, although the power supply voltage Vcc is varied as shown in FIG. 8, at (a) depending on a charging condition of the battery, such variations are smoothed by charging and discharging the capacitor $C_1$ of the power supply voltage correction circuit 46, thereby reducing undesirable influences from variations in the power supply voltage.

Figure 9:
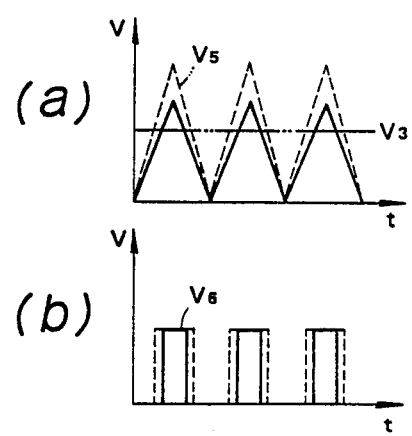
FIG. 9 is a waveform diagram showing an output voltage of a triangular wave generating circuit and an output voltage of a comparison circuit respectively at (a) and (b)

Since the correction voltage $V_4$ is supplied to the triangular wave generating circuit 49, the input voltage to the non-inverting input side of the integrator 50 is raised by the voltage divider resistors $R_6$ and $R_7$ higher than the ground potential, and a peak value of the triangular wave outputted from the integrator 50 is approximately equal to a peak value when the voltage correction is not carried out as shown by the solid line in FIG. 9, at (a).

In other words, supposing that in the square wave generating circuit 51, the transistor $Q_2$ is in an ON condition, and the transistor $Q_3$ is in an OFF condition and its collector voltage is at a high level when the capacitor $C_3$ in the integrator 50 is in a discharged condition, the capacitor $C_3$ is charged gradually, and correspondingly, the output voltage of the OP amp $A_1$ is decreased gradually from the predetermined divided voltage.

On the other hand, a relatively high level voltage is being outputted by the OP amp $A_2$ in the square wave generating circuit 51, since the inverting input terminal of the OP amp $A_2$ is at a collector coltage, that is, ground voltage until the output voltage supplied to the non-inverting input terminal reaches ground voltage. As a result, the transistor $Q_2$ is maintained in the saturated condition, and from this condition, when the output of the integrator 50 is decreased to the ground potential, the output of the OP amp $A_2$ becomes the ground potential, and consequently, the transistor $Q_2$ is turned OFF and its collector voltage reaches a high level. Thus, the output of the OP amp $A_2$ is maintained at the ground level, and in addition, since the transistor $Q_3$ is turned ON, its collector voltage is decreased to the ground potential. As a result, the capacitor $C_3$ in the integrator 50 is in a discharging condition, and correspondingly, the output of the OP amp $A_1$ is increased gradually. When this output reaches a high level equal to that supplied to the inverting input terminal of the OP amp $A_2$, the transistor $Q_2$ is inverted on the ON condition, and correspondingly, the transistor $Q_3$ is turned OFF, and returns to the initial condition. The above operations are repeated following this sequence, and the triangular wave voltage having a peak value corresponding to the correction voltage $V_4$ from the integrator 50 is outputted.

Since the triangular wave voltage $V_5$ and the output voltage $V_3$ of the frequency-voltage converting circuit 44 are supplied to the comparison circuit 52, the pulse modulated voltage $V_6$, which reaches a high level when the triangular wave voltage $V_5$ exceeds the output voltage $V_3$ as shown in FIG. 9, at (a), is outputted. At this time, since the vehicle is in the high speed travelling condition, the output voltage of the frequency-voltage converting circuit 44 reaches a high voltage $V_H$ as shown in FIG. 7, and the width of the ON condition of the pulse voltage $V_6$ outputted from the comparison circuit 52 becomes narrow. The pulse voltage is power amplified by the power amplifying circuit 53, and an exciting current outputted from the power amplifying circuit 53 is supplied to the electromagnetic solenoid 8g. In this case, since the pulse width during the ON condition is narrow, the effective value of the exciting current is very small, and the electromagnetic force is also small.

When the vehicle speed is decreased from a high speed condition by stepping down on the brake pedal, the frequency of the detection signal from the vehicle speed sensor 41 is decreased, and thus the level of the voltage output delivered from the frequency-voltage converting circuit 44 is also lowered. As a result, the bypassed portion of the current flowing to the transistor $Q_1$ in the solenoid voltage correction section 47 is decreased, and correspondingly, the charging voltage of the capacitor $C_2$ is increased gradually with a rising rate determined by the time constant defined by a capacitance of the capacitor $C_2$ is and a resistance of the resistor $R_3$, and the output voltage of the buffer circuit 48 is also increased gradually. Since the previous voltage is maintained until just before the voltage of the voltage correction circuit 45 begins to increase, the triangular wave voltage outputted from the triangular wave generating circuit 49 maintains its previous peak value, and the pulse width of the pulse width modulated voltage $V_6$ outputted from the comparison circuit 52 is increased by an amount corresponding to a decrease in the output voltage of the frequency-voltage converting circuit 44, and thus, the effective value of the exciting current outputted from the power amplifying circuit 53 increases.

Figure 10:
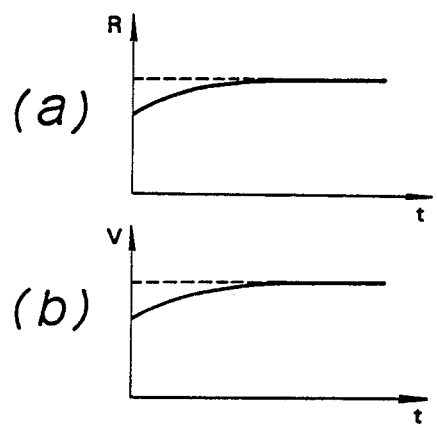
FIG. 10 is a waveform diagram showing a resistance change of an electromagnetic solenoid and a correction voltage in a solenoid voltage correcting section respectively at (a) and (b)

In this manner, when the exciting current supplied to the electromagnetic solenoid 8g of the variable orifice valve 8 is increased, the amount of heat generated in the solenoid coil is also increased due to the increase in the exciting current, and the internal resistance of the solenoid coil is increased with time as shown in FIG. 10, at (a). When the internal resistance of the solenoid coil increases, if the voltage inputted to the power amplifying circuit 53 is a constant voltage, then the amount of current flowing through the solenoid would decrease and the electromagnetic force would also decrease. Consequently, the position of the spool 8h of the variable orifice valve 8 would deviate from a position accurately corresponding to the vehicle speed.

Figure 11:
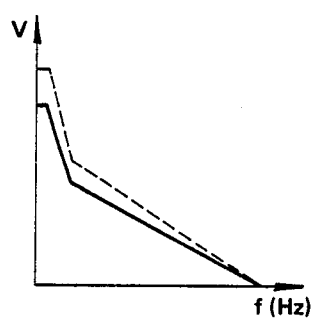
FIG. 11 is a graph showing a relationship between the effective value of an output voltage of a pulse width modulation circuit and a frequency.
Figure 12:
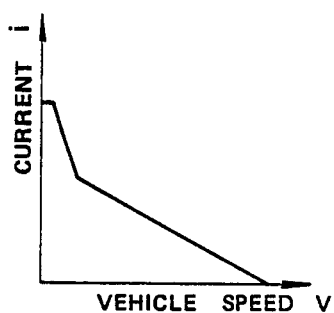
FIG. 12 is a graph showing a relationship between a vehicle speed and an exciting current supplied to the electromagnetic solenoid.

However, in the present invention, specifically, in the voltage correction circuit 45, when the output voltage of the frequency-voltage converting circuit 44 is decreased, that is, when the vehicle speed is decreased, if the bypassed current to the transistor $Q_1$ is decreased, the power supply voltage from the power supply correction section 46 is charged on the capacitor $C_2$ with a rise rate determined by the time constant defined by the capacitance of the capacitor $C_2$ and the resistance of the resistor $R_3$. As a result, the correction voltage $V_4$ output from the buffer circuit 48 is increased with time to compensate for the change in the internal resistance of the electromagnetic solenoid 8g as shown in FIG. 10, at (b). Accordingly, the peak value of the triangular wave voltage of the triangular wave generating circuit 49 is increased with the increase of the correction voltage $V_4$ as shown by the dotted line in FIG. 9, at (a), and as a result of this, the pulse width of the pulse width modulated voltage $V_6$ outputted from the comparison circuit 52 is made wide as shown by the dotted line in FIG. 9, at (b). Thus, the effective value of the exciting current obtained by amplifying the output of the comparison circuit 52 becomes high as shown by the dotted line in FIG. 11 in contrast with that obtained when the voltage correction is not carried out as shown by the solid line in FIG. 11. And it is possible to compensate for the decrease in the exciting current due to the increase in the internal resistance of the electromagnetic solenoid 8g, and to control the amount of the exciting current supplied to the electromagnetic solenoid 8g to a value accurately corresponding to the vehicle speed as shown in FIG. 12.

When the vehicle is in a stopped condition or approaches this condition by holding the brake pedal depressed, in this condition the output of the vehicle sensor 41 is zero, and no output pulse is obtained from the pulse width regulating circuit 43. As a result, since the output voltage of the frequency-voltage converting circuit 44 is also zero as shown in FIG. 7, the transistor $Q_1$ in the solenoid voltage correction section 47 in the voltage correction circuit 45 is turned OFF, and the charging voltage on the capacitor $C_2$ becomes approximately equal to the power supply voltage supplied from the power supply voltage correction section 46, and the peak value of the triangular wave voltage from the triangular wave generating circuit 49 becomes maximum. Accordingly, the pulse width of the pulse width modulated voltage $V_6$ from the comparison circuit 52 is made maximum, and the amount of the exciting current supplied to the electromagnetic solenoid 8g becomes maximum.

In this respect, the vehicle speed sensor is not limited to the tachogenerator, and a revolution number detector such as an optical or magnetic type mounted on the output side of a transmission and outputting one or more pulses per one revolution can be applied, and in that case, the waveform shaping circuit 42 can be omitted.

Further, the control unit 15 is not limited to control of the variable orifice valve 8 based on the vehicle speed detection signal of the vehicle sensor 41. The control unit 15 can also control the variable orifice valve 8 by performing a predetermined processing based on the detection signal of the vehicle sensor 41 and a detection signal of a physical quantity detector such as a steering angle sensor 55 for detecting a steering angle of the steering wheel.

Further, the voltage correction circuit 45 is not limited to the arrangement described above, and it is only required to be arranged to enable the correction of the output pulse width in the pulse width modulation circuit including the frequency-voltage converting circuit 44, triangular wave generating circuit 49, and comparison circuit 52, in accordance with the internal resistance change of the electromagnetic solenoid.

Still further, a microcomputer can be used in the control unit 15 for voltage correction processing similar to the aforementioned embodiment to execute predetermined processing based on the detection signal of the vehicle sensor.

Figure 13:
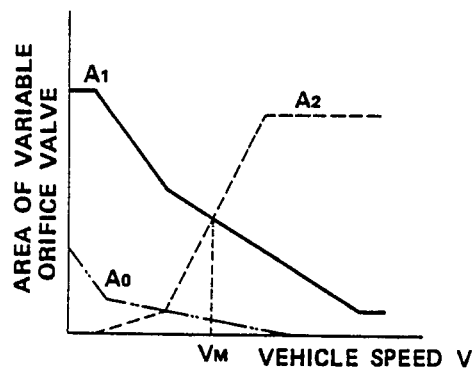
FIG. 13 is a graph showing a relationship between the vehicle speed and communicating areas at various parts of the variable orifice valve.

Here, and example of the operation performed by the control unit 15 is represented by a relationship between communicating areas of the variable orifice valve with respect to the vehicle speed. In FIG. 13, the curve of the solid line indicates an opening area of the variable orifice $A_1$ formed between the output port 8e and the input port 8a, and the curve of the dotted line indicates an opening area of the variable orifice $A_2$ formed between the output port 8d and the input port 8a, and the curve of the chain line indicates an opening area of the variable orifice $A_o$ formed between the output port 8d and the drain poirt 8c.

The rotary changeover valve 9 (FIG. 3) includes a cylindrical housing 7a, an outer sleeve 9b connected by a connecting pin 9a to a pinion shaft 21 fitted inside the housing 7a forming a steering member (which will be described later), and a rotary sleeve 9c formed integrally with an input shaft 20 rotatably fitted inside the outer sleeve 9b.

In the outer sleeve 9b, pairs of input ports $9d_1$, $9d_2$ and $9e_1$, $9e_2$ respectively connected to the output ports 8e and 8d are formed at an interval of 90°. On both sides and adjacent to the input ports $9d_1$ and $9d_2$, there are respectively provided input/output ports $9f_1$, $9g_1$ and $9f_2$, $9g_2$, and on both sides and adjacent to the input ports $9e_1$ and $9e_2$, there are respectively provided passages $9h_1$, $9i_1$ and $9h_2$ and $9i_2$.

Further, in the rotary spool 9c, at positions respectively opposing to the passages $9h_1$, $9i_1$, $9h_2$, and $9i_2$ of the outer sleeve 9b, there are formed input/output ports $9j_1$, $9k_1$, $9j_2$, and $9k_2$, and at positions respectively opposing to the input ports $9d_1$, $9d_2$, $9e_1$, and $9e_2$, there are formed passages $9l_1$ to $9l_4$. Between the passages $9l_1$ to $9l_4$, there are provided drain passages $9m_1$ to $9m_4$, and each of the drain passages $9m_1$ to $9m_4$ is connected to the return port 8f of the variable orifice valve 8 through a cavity 9n within the rotary spool 9c. Here, each of the passages $9l_1$ to $9l_4$ and the drain passages $9m_1$ to $9m_4$ is, when the rotary spool 9c is at the neutral position as shown in FIG. 2, communicated with the input/output ports respectively opposing to both ends of the spool through very small opening areas.

The power cylinder 10 includes a piston rod 10a constituting, for example, a rack shaft of a rack-and-pinion type steering gear, and opposite ends of the rack shaft are connected with right and left steerable wheels (not shown) through steering rods (not shown). One pressure chamber 10c of pressure chambers 10c and 10d defined by a piston 10b communicates with the input/output ports $9f_1$ and $9f_2$ of the rotary changeover valve 9, and the other pressure chamber 10d communicates with the input/output ports $9g_1$ and $9g_2$.

The steering reaction force mechanism 11 is formed with cylindrical guide holes 11a and 11b which are disposed at the upper end portion of the pinion shaft 21 serving as an output shaft symmetrically on both sides of a center axis. Control plungers 11c and 11d are respectively inserted in the center positions of the guide holes 11a, 11b forming pressure chambers 11e, 11f, 11g, and 11h, which are defined by both ends of each of the plungers 11c and 11d and a hollow cylindrical body 22 fitted around the periphery of the pinion shaft 21. Further, one end of the input shaft 20 is rotatably inserted in the axial central portion of the pinion shaft 21, and engaging projections 20a and 20b formed symmetrically on the input shaft 21 are respectively engaged with engaging cavities 11i and 11j formed in the plungers 11c and 11d. The pressure chambers 11e and 11h respectively communicate with the input/output ports $9k_1$ and $9k_2$, and the pressure chambers 11f and 11g respectively communicate with the input/output ports $9j_1$ and $9j_2$. In this case, as shown in FIG. 3, the pressure chambers 11e, 11h and the input/output ports $9k_1$, $9k_2$ are communicated through a passage 9o formed inside of the rotary spool 9c, through a passage 9p defined by the lower end of the outer sleeve 9b and the lower end of the rotary sleeves 9c and through a passage 11q formed inside of the control plungers 11c, 11d. Similarly, the pressure chambers 11f, 11g and the input/output ports $9j_1$, $9j_2$ are communicated through a passage 9q formed inside of the rotary spool 9c, a passage 9r formed in the outer sleeve 9b, a cavity 9s surrounded by the housing 7a and outer sleeve 9b, and a passage 9t formed in the pinion shaft 21.

As shown in FIG. 3, a torsion bar 23 is interposed between the input shaft 20 and the pinion shaft 21. The torsion bar 23 is inserted into a through hole 24 formed axially in the input shaft 20, and its upper end is connected by a pin 25 to the input shaft 20, and its lower end is serratedly coupled with the pinion shaft 21, and the pinion shaft 21 is in turn engaged with the rack shaft 26 which constitutes a steering member.

In this respect, the lower end portion of the torsion bar 23 is supported by a bearing 11l fitted in the lower end portion of the through hole 24 of the input shaft 20 so that the lower end portion of the torsion bar 23 is rotatable relative to the lower end portion of the input shaft 20.

Figure 4:
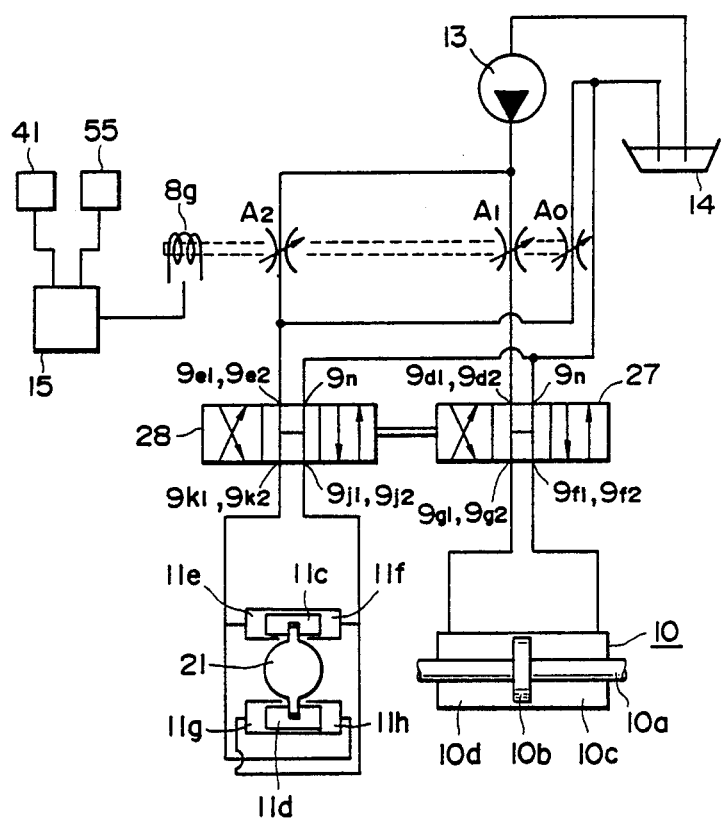
FIG. 4 is a hydraulic pressure circuit diagram of the variable steering force power steering device.

The connection relationships in the variable steering force power steering device 7 described in the foregoing are represented by a hydraulic circuit diagram shown in FIG. 4. In FIG. 4, reference numerals 27 and 28 designate directional control valves, and the directional control valve 27 corresponds to the input/output ports $9d_1$, $9d_2$, $9f_1$, $9f_2$, $9g_1$, and $9g_2$, and the directional control valve 28 corresponds to the input/output ports $9e_1$, $9e_2$, $9j_1$, $9j_2$, $9k_1$, and $9k_2$.

The steering angle varying mechanism 4 is, as shown in FIG. 14, composed of a housing 31 fitted outside a column tube 3, an output shaft 5 rotatably supported within the housing 31, a torsion bar 32 of a resilient body having a relatively high torsional rigidity of about 15 Kgfcm/deg which is interposed between the steering shaft 2 constituting the input shaft and the output shaft 5, and rotational displacement generating means 33 for providing a rotational displacement to the steering shaft 2 which is formed on the upper end of the output shaft 5.

The torsion bar 32 is inserted rotatably into a through hole 2a formed in the steering shaft 2, the upper end of the torsion bar 32 is secured to the steering shaft 2 by a pin 34, and the lower end is also secured to the output shaft 5 by a pin 35.

In the rotational displacement generating means 33, as shown in FIG. 15, cylindrical cavity sections 33a and 33b are formed in the upper end portion of the output shaft 5 on both sides of the central axis symmetrically and in parallel with each other. Plungers 33c and 33d are inserted respectively at the central positions of these cavity sections 33a and 33b, and pressure chambers 33e, 33f, and 33g, 33h are formed between both ends of each of the plungers 33c, 33d and a hollow cylindrical body 36 fitted around the periphery of the output shaft 5. Furthermore, one end portion of the steering shaft 2 is rotatably inserted in the axially central portion of the output shaft 5, and engaging projections 2b and 2c formed symmetrically on the end portion of the steering shaft 2 are engaged with engaging cavities 33i and 33j formed in the plungers 33c and 33d. As shown in FIG. 14, the pressure chambers 33e and 33h are communicated with an input/output port 33n formed in the peripheral surface of the housing 31 through a passage 33k formed in the output shaft 5, a passage 33l formed between the peripheral surface of the output shaft 5 and the inner surface of the housing 31, and a passage 33m formed in the housing 31, and this input/output port 33n is communicated with the input/output ports $9j_1$ and $9j_2$ shown in FIG. 3. Here, the input/output port 33n and the input/output ports $9j_1$, $9j_2$ are communicated with each other by connecting the input/output port 33n by means of a fluid piping 37 to a passage 9u branched from a passage 9s within the 7a shown in FIG. 3.

On the other hand, the pressure chambers 33f and 33g are communicated with an input/output port 33r formed in the peripheral surface of the housing 31 through a passage 33o formed in the output shaft 5, a passage 33p formed between the peripheral surface of the output shaft 5 and the inner surface of the housing 31, and a passage 33q formed in the housing 31 as shown in FIG. 14, and this input/output port 33r is connected to the input/output ports $9k_1$, $9k_2$ of the rotary control valve 9 shown in FIG. 3. Here, the input/output port 33r and the input/output ports $9k_1$, $9k_2$ are communicated with each other through the pressure chambers 11e, 11h in the steering reaction force generating mechanism 11 shown in FIG. 3, and with a passage 11m between the lower end of the input shaft 20 and the pinion shaft 21, a serration fitting portion 11n of the torsion bar 23 and pinion shaft 21, a passage 11o formed in the central portion of the pinion shaft 21, a passage 11p formed in a cap 7b screwed in the lower end of the housing, and a fluid piping 38. In this respect, in FIG. 14, leakage of fluid from an oil seal 33s, plungers 33c, 33d, etc., is collected to a cavity 33v formed in the upper end of the output shaft 5 through a passage 33t formed in the output shaft 5, and a passage 33u formed in the lower peripheral surface of the torsion bar 32. Overflowing fluid from the cavity 33v is supplied to a drain port 33y through the inside of a bearing 33w and through a pair of check valves 33x. The drain port 33y is connected to the return port 8f of the variable orifice valve 8.

Further, in the steering angle ratio varying mechanism 4, instead of exerting a couple of forces to the steering shaft 2 in the same friction as the steering direction by means of the plungers 33c, 33d operated by the reactive hydraulic pressure, either one of the plungers may be omitted and the rotational displacement can be provided to the steering shaft 2 by the other plunger alone.

Further, instead of producing the rotational displacement by exerting the couple of forces to the steering shaft 2 directly by the plungers 33c, 33d, the plungers may be coupled with the steering shaft 2 through a transmission mechanism such as a rack-and-pinion, or the like.

Further, although the torsion bar 32 is applied as a resilient body of the steering angle ration varying mechanism 4, other resilient bodies having a relatively large torsional rigidity such as hard rubber, FRP, etc., may be used.

Next, the operation in the above embodiment will be described. Now, supposing that the vehicle is in a stopped condition, in this condition, since the vehicle speed is zero, the effective value of the driving current outputted from the control unit 15 is maximum. Accordingly, the spool 8h is held at a position moved to the left against the return spring 8i by the electromagnetic solenoid 8g. As a result, in the variable orifice valve 8, as shown in FIG. 13, the communicating area between the input port 8a and the output port 8e is maximum, and the communicating area between the input port 8a and the output port 8d is zero, and the communicating area between the output port 8d and the drain port 8c is maximum.

Consequently, the whole of the hydraulic fluid supplied from the pump 13 is supplied to the output port 8e, and then supplied to the input ports $9d_1$, $9d_2$ of the rotary changeover valve 9. At this time, when the steering wheel 1 is not turned while the vehicle is at rest, as shown in FIG. 2, the rotary spool 9c is at the neutral position, and thus the hydraulic fluid supplied to the input ports $9d_1$, $9d_2$ flows branched from the passages $9l_1$, $9l_2$ to the input/output ports $9f_1$, $9g_1$ and $9f_2$, $9g_2$, and is supplied to the pressure chambers 10c and 10d of the power cylinder 10. However, since both the pressure chambers 10c and 10d are at equal pressure, the piston rod 10a is at the central position, and the steering wheel is maintained at the straight-travelling position. Thus, the hydraulic fluid flowing separately to each of the input/output ports $9f_1$, $9g_1$ and $9f_2$, $9g_2$ flows into the adjacent drain passages $9m_1$ to $9m_4$, and returns to the tank 14 through the cavity 9n, return port 8f, and the drain port 8b of the variable orifice valve 8.

Further, in this stopped condition, when the steering wheel 1 is turned in the right direction (or left direction) while the vehicle is at rest, the steering force of the steering wheel 1 is transmitted to the input shaft 20 through the steering shaft 2, torsion bar 32 with a relatively large torsional rigidity, output shaft 4, and universal joint 5, causing the rotary spool 9c of the rotary changeover valve 9 to be rotated in the clockwise direction (or counterclockwise direction) viewed in FIG. 2. As a result, the communicating areas between the input ports $9d_1$, $9f_2$ and input/output ports $9g_1$, $9g_2$ (or $9f_1$, $9f_2$) become large as compared with the communicating areas between the input ports $9d_1$, $9d_2$ and the input/output ports $9f_1$, $9f_2$ (or $9g_1$, $9g_2$), and thus the pressure in the pressure chamber 10d (or 10c) side of the power cylinder 10 becomes high as compared with that in the pressure chamber 10c (or 10d), and the piston rod 10a is moved in the right direction (or left direction), and a predetermined steering assisting force is generated to enable turning of the steering wheel with a slight force while the vehicle is at rest. At this time, due to the movement of the piston rod 10a, the fluid pushed out from the pressure chamber 10c (or 10d) flows through the input.output ports $9f_1$, $9f_2$ (or $9g_1$, $9g_2$) of the rotary changeover valve 9 and the drain passages $9m_3$, $9m_4$, and returns to the tank 14 through the cavity section 9n, and the return port 8f and drain port 8b of the variable orifice valve 8. Further, the working fluid remaining in the pressure chambers 11e, 11h (or pressure chambers 11f, 11g) of the steering reaction force generating mechanism 11 returns to the oil tank 14 through the input/output ports $9k_1$, $9f_2$ (or $9j_1$, $9j_2$) and $9e_1$, $9e_2$, and through the output port 8d, orifice $A_0$, and drain port 8c of the variable orifice valve 8. Thus, unnecessary steering reaction force is never generated with respect to the input shaft 20.

When the vehicle is in a travelling condition and the vehicle speed is increased, the effective value of the driving current outputted from the control unit 15 is decreased, and thus, the spool 8h of the variable orifice valve 8 is moved to the right by the return spring 8i, and the communicating area between the input port 8a and the output port 8e is decreased. As a result, the fluid pressure supplied to the power cylinder 10 is decreased and the steering assisting force is decreased. Eventually, the thrust of the rack shaft 26 with respect to the input shaft torque is decreased with the increase in the vehicle speed as shown in FIG. 16, and approaches the characteristic in a manual steering condition indicated by letters M.S. wherein no steering assisting force is generated by the power cylinder 10.

Figure 16:
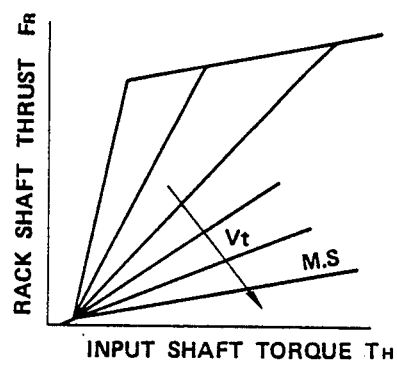
FIG. 16 is a graph showing a relationship between an input shaft torque and a rack shaft thrust with respect to a vehicle speed as a parameter.

In this respect in FIG. 16, when an increase in the input shaft torque THE exceeds a certain valve in a relatively small range of the vehicle speeds, the rack shaft thrust $F_R$ merely increases slightly. The reason for this is that since a relief circuit is provided in the supply tank 13, the power assistance above a certain value is not effected.

Figure 17:
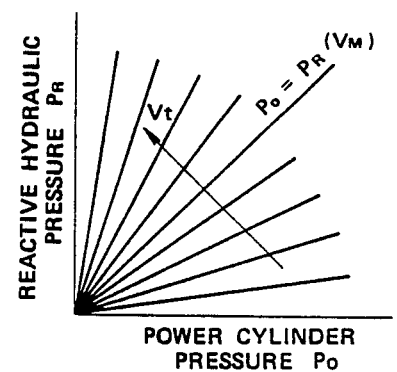
FIG. 17 is a graph showing a relationship between a power cylinder pressure and a pressure of the steering reaction force generating mechanism with respect to the vehicle speed as a parameter.

On the other hand, the communicating area between the input port 8a and output port 8d of the variable orifice valve 8 is increased with the increase in the vehicle speed as shown in FIG. 13, and also the communicating area between the output port 8d and drain port 8c is decreased. Accordingly, a part of the hydraulic fluid supplied from the pump 13 is supplied to the input ports $9e_1$, $9e_2$ of the rotary changeover valve 9. As a result, when the steering wheel 1 is turned to the right (or left), the rotary spool 9c of the rotary changeover valve 9 is rotated in the clockwise direction (or counter-clockwise direction). Accordingly, the pressure of the hydraulic fluid in the input/output ports $9k_1$, $9k_2$ ($9j_1$, $9j_2$) sides becomes high as compared with that in the input/output ports $9j_1$, $9j_2$ (or $9k_1$, $9k_2$) sides, and this pressure is supplied to the pressure chambers 11e and 11h (or 11f and 11g) of the steering reaction force mechanism 11. Thus, the plungers 11c, 11d exert a couple of forces as steering reaction force to the input shaft 20 in the opposite direction to the steering direction, and the steering feeling for the steering wheel 1 becomes heavy and abrupt steering is prevented. Here, the relationship between the pressure in the power cylinder 10 and the pressure in the steering reaction force mechanism 11 as a parameter of the vehicle speed V is shown in FIG. 17. When a predetermined border vehicle speed $V_M$ is set between low and high vehicle speed regions where the communicating areas of the output ports 8d and 8e with respect to the input port 8a of the variable orifice valve 8 are equal to each other, whereas in the low vehicle speed region, the pressure in the power cylinder 10 is larger than the pressure in the steering reaction force generatieng mechanism 11, and conversely, in the high vehicle speed region, the pressure in the steering reaction force generating mechanism 11 is larger than the pressure in the power cylinder 10, and thus optimum steering feeling can be obtained corresponding to the vehicle speed.

Figure 18:
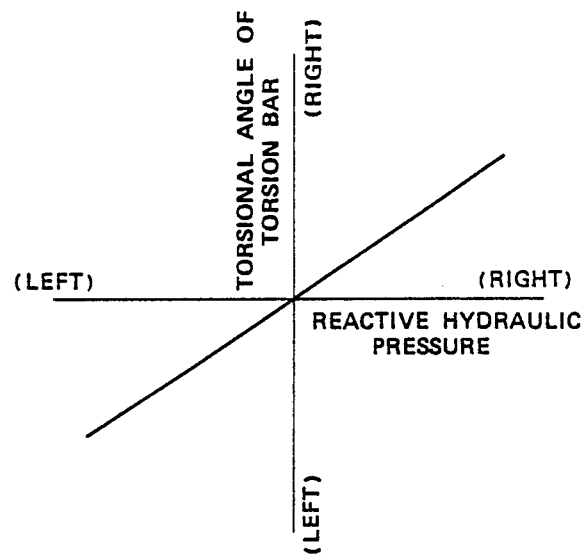
FIG. 18 is a graph showing a relationship between a reactive hydraulic pressure and a torsional angle of a torsion bar.

Similarly, in such a condition in which the hydraulic fluid is outputted to the input/out ports $9k_1$, $9k_2$ (or $9j_1$, $9j_2$) of the rotary changeover valve 9, this hydraulic fluid is also supplied to the input port 33m (or 33r) of the steering angle ratio varying mechanism 4. Thus, the hydraulic fluid supplied to the input port 33n, 33h (or 33f, 33g) of the rotation mechanism 33 through passages 33m, 33l, 33k (or fluid paths 33q, 33p, 33o). Accordingly, the plungers 33c and 33d are moved so that the couple of forces to rotationally displace the steering shaft 2 in the steering direction is generated. Consequently, the angular displacement of the steering shaft 2 in accordance with the steering angle is increased against the torsional rigidity of the torsion bar 32, and the steering angle ratio is increased. In this respect, a relationship between the reactive hydraulic pressure supplied to the pressure chambers 33e, 33h and 33f, 33g, and the torsional angle of the torsion bar 32 is, as shown in FIG. 18, in a proportional relationship so that the torsional angle increases with the increase in the reaction force pressure.

Next, change of the steering angle ratio by the steering angle ratio varying mechanism 4 will be described. First, a steering angle $\theta_S$ of the steering wheel 1 can be expressed by the following formula:

$$\theta_S = \theta_G + \theta_R \quad (1)$$

$$\theta_G = n_G \cdot \theta_W$$

$$\theta_R = \frac{T_H}{K} + \frac{2 \cdot S_P \cdot P_R \cdot R}{K}$$

where, $\theta_G$ is the rotational angle of the input shaft of the rack-and-pinion type steering gear, $\theta_R$ is the torsional angle of the steering angle ratio varying mechanism 4, $n_G$ is the gear ratio of the rack-and-pinion type steering gear, $\theta_w$ is the rotational angle of the tire, $T_H$ is the steering torque acting on the steering wheel 1, K is the spring constant of the torsion bar 32, $S_P$ is the area of the plungers 33c, 33d, $P_R$ is the reactive hydraulic pressure, and R is the length (radius) of the engaging projections 2b, 2c of the steering shaft 2 from the center of the input shaft 20.

Figure 19:
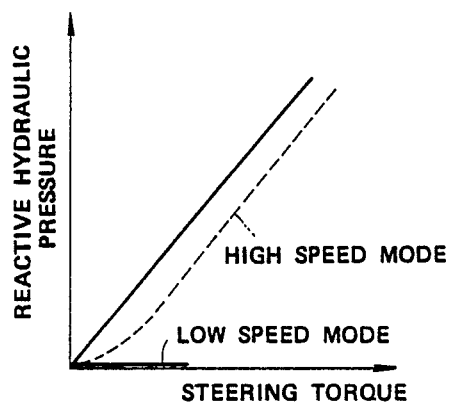
FIG. 19 is a graph showing a relationship between steering torque and the reactive hydraulic pressure.

Further, a relationship between the steering torque acting on the steering wheel 1 and the reactive hydraulic pressure is shown in FIG. 19. In the low vehicle speed region, as indicated by the solid line curve, the reactive hydraulic pressure is not substantially produced, and also, the steering torque required at this time is a magnitude obtained by multiplying an angle (about 3°) to completely shut the rotary spool 9c of the rotary changeover valve 9 by the spring constant of the torsion bar 32, and thus the required torque is small. On the other hand, in the high vehicle speed region, as shown by the dotted line curve, even when the steering torque is small and the rotary spool 9c of the rotary changeover valve 9 is not rotated so much (about 1°), the reactive hydraulic pressure rises.

Figure 20:
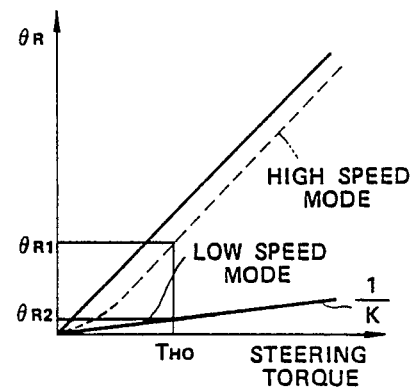
FIG. 20 is a graph showing a relationship between the steering torque and the torsional angle.

Therefore, when the torsional angle $\theta_R$ of the torsion bar 32 in the steering angle ratio varying mechanism 4 is calculated based on the aforementioned formula (1) by changing the steering torque, the results are obtained as shown in FIG. 20. It will be understood from FIG. 20 that with respect to the same steering torque, the torsional angle $\theta_{RH}$ in the high vehicle speed region is large, i.e., as much as several times the torsional angle $\theta_{RL}$ in the low vehicle speed region.

Figure 21:
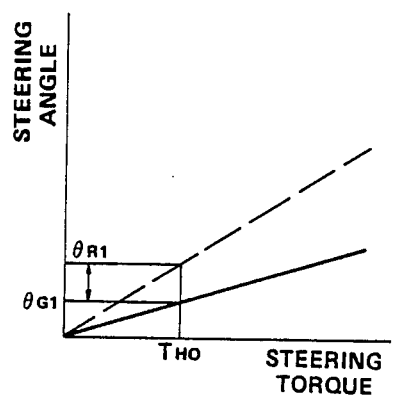
FIG. 21 is a graph showing a relationship between the steering torque and a steering angle at a high vehicle speed.
Figure 22:
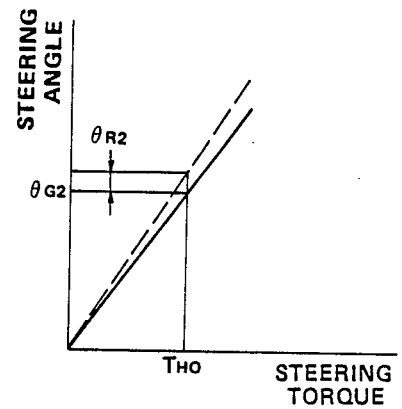
FIG. 22 is a graph showing a relationship between the steering torque and the steering angle at a low vehicle speed.

Further, relationships between the steering torque and the steering angle are respectively shown in FIG. 21 in the low vehicle speed region and in FIG. 22 in the high vehicle speed region. In each of FIGS. 21 and 22, the solid straight line indicates a rigidity characteristic due to a self-aligning torque of the tire, and it becomes large as the vehicle speed increases.

Accordingly, supposing that the angles of rotation, of the input shaft 20 of the rack-and-pinion, to rotate the tire based on the self-aligning torque of the tire are respectively $\theta_{GH}$ and $\theta_{GL}$, total steering angles $\theta_{SH}$ and $\theta_{SL}$ of the steering wheel 1 can be obtained by respectively adding torsional angles $\theta_{RH}$ and $\theta_{RL}$ to the angles of rotation $\theta_{GH}$ and $\theta_{GL}$. That is:

$$\theta_{SH} = \theta_{GH} + \theta_{RH} \quad (2)$$

$$\theta_{SL} = \theta_{GL} + \theta_{RL} \quad (3)$$

Furthermore, steering angle ratios of the rotational angles $\theta_{WH}$, $\theta_{WL}$ of the tire and the total steering angles $\theta_{SH}$, $\theta_{SL}$ of the steering wheel 1 are expressed as follows:

$$n_{GH} = \frac{\theta_{SH}}{\theta_{WH}} = n_G + \frac{\theta_{RH}}{\theta_{WH}} \quad (4)$$

$$n_{GL} = \frac{\theta_{SL}}{\theta_{WL}} = n_G + \frac{\theta_{RL}}{\theta_{WL}} \quad (5)$$

Here, the torsional angles $\theta_{RH}$ and $\theta_{RL}$ of the steering angle ratio varying mechanism 4 are, as will be apparent from FIG. 20, in a relation $\theta_{RH} > \theta_{RL}$, and the rotational angle of the tire becomes small as the vehicle speed increases, since the steering assisting torque becomes small with increasing vehicle speed, and thus $\theta_{WH} < \theta_{WL}$.

Therefore, the values of the second terms in the right-hand sides of the formulas (4) and (5) differ to a great extent, and eventually the steering angle ratios result in $n_{GH} > n_{GL}$, and the steering angle ratio $n_{GH}$ in the high vehicle speed region assumes a far greater value than the steering angle ratio $n_{GL}$ in the low vehicle speed region.

As a result, optimum steering feeling can be obtained throughout the whole region from the low vehicle speed region to the high vehicle speed region.

More specifically, the torsional rigidity of the torsion bar 32 is selected to be a large value, and thus in the low vehicle speed region, the rotational displacement produced by the rotational displacement generation means 33 is not imparted to the steering shaft 2, and the steering force of the steering wheel 1 is transmitted to the steering assisting force generating device with a slight rotational displacement caused by a slight torsion of the torsion bar 32 itself having a relatively high torsional rigidity. Thus, a steering force can be transmitted which is substantially the same as in the usual case having no torsion bar 32. On the other hand, in the high vehicle speed region, since the rotational displacement in the steering direction is generated by the rotational displacement generating means 33 and it is designed to positively increase the torsional angle of the torsion bar 32, it is possible to prevent the so-called over steering of the steering wheel 1 while steering during high vehicle speed travelling to ensure stability in the straight-travelling of the vehicle.

As described in the foregoing, in this embodiment, a part of the reactive hydraulic pressure supplied to the steering reaction force generating mechanism 11 is supplied to the rotational displacement generating means 33 in the steering angle ratio varying mechanism 4. Thus, the piping to connect to the tank 14 is not required, the layout of piping is simplified, and the costs can be reduced. At the same time, since the steering angle ratio varying mechanism is disposed around the steering shaft 2 constituting the input shaft, the overall configuration can be made simple and small in size.

While in the above embodiment, it was explained with reference to the case in which the drain port 8b and the return port 8f were provided in the variable orifice valve 8, these ports may be omitted and the cavity 9n in the rotary changeover valve may be directly connected to the oil tank 14.

Further, when the arrangement in FIG. 5 is not applied to the control unit, the variable orifice valve 8 can be of the rotary type in place of the translation type.

Further, the variable orifice $A_0$ as the opening and closing valve is not limited to being provided in the variable orifice valve 8, and the variable orifice $A_0$ may be configured as a separate body from the variable orifice valve 8 and configured to operate in association with the spool 8h, and it may be connected to the output port 8d of the variable orifice valve 8.

Further, the steering reaction force generating mechanism 11 is not limited to a case in which the couple of forces are generated in the input shaft 20 by the control plungers 11c, 11d, and the control plungers 11c, 11d may be disposed in parallel with the axial directly of the input shaft 20 to thereby act with a pressing force in respect to the control arms 20a, 20b.

Next, another embodiment of the present invention will be described with reference to FIG. 23.

This embodiment is designed to prevent impairing the steering feeling and degrading the durability when the steering reaction force in the steering reaction force generating mechanism 11 becomes excessively large.

More specifically, a relief valve 60 as hydraulic pressure regulating means is inserted between an output port 8d of a variable orifice valve 8o and an oil tank 14. This relief valve 60 suppresses the pressure of working fluid outputted from the output port 8d of the variable orifice valve 80 to a predetermined pressure (e.g., 50 Kgf/cm$^2$) or less, and thus it prevents the steering reaction force from becoming excessively large to provide unnecessarily heavy steering feeling, and at the same time, it protects a torsion bar 23 and its lock pin 25 from being damaged due to fatigue, breakage and improves durability. In other words, when the steering wheel 1 is turned to the right, in the case in which the working fluid is to be supplied to the steering reaction force generating mechanism 11, as shown in FIG. 3, since the working fluid is supplied to the steering reaction force generating mechanism 11 through the passages 9o, 9p between the outer sleeve 9b and the spool 9c of the rotary changeover valve 9, if the pressure of the working fluid is high (e.g., 140 Kgf/cm$^2$), the outer sleeve 9b is pushed upwardly by this pressure. In this case, since the outer sleeve 9b is connected to the spool 9c (input shaft 20) through the thrust bearing 9u as shown in FIG. 3, the input shaft 20 is acted thereon in addition to the pressure of the working fluid, causing a large tensile stress in a direction upwardly separating from the pinion shaft 21 due to the pressing pressure from the thrust bearing 9u, and the combination of the pressure and force can cause fatigue, breakage and damage.

Figure 23:
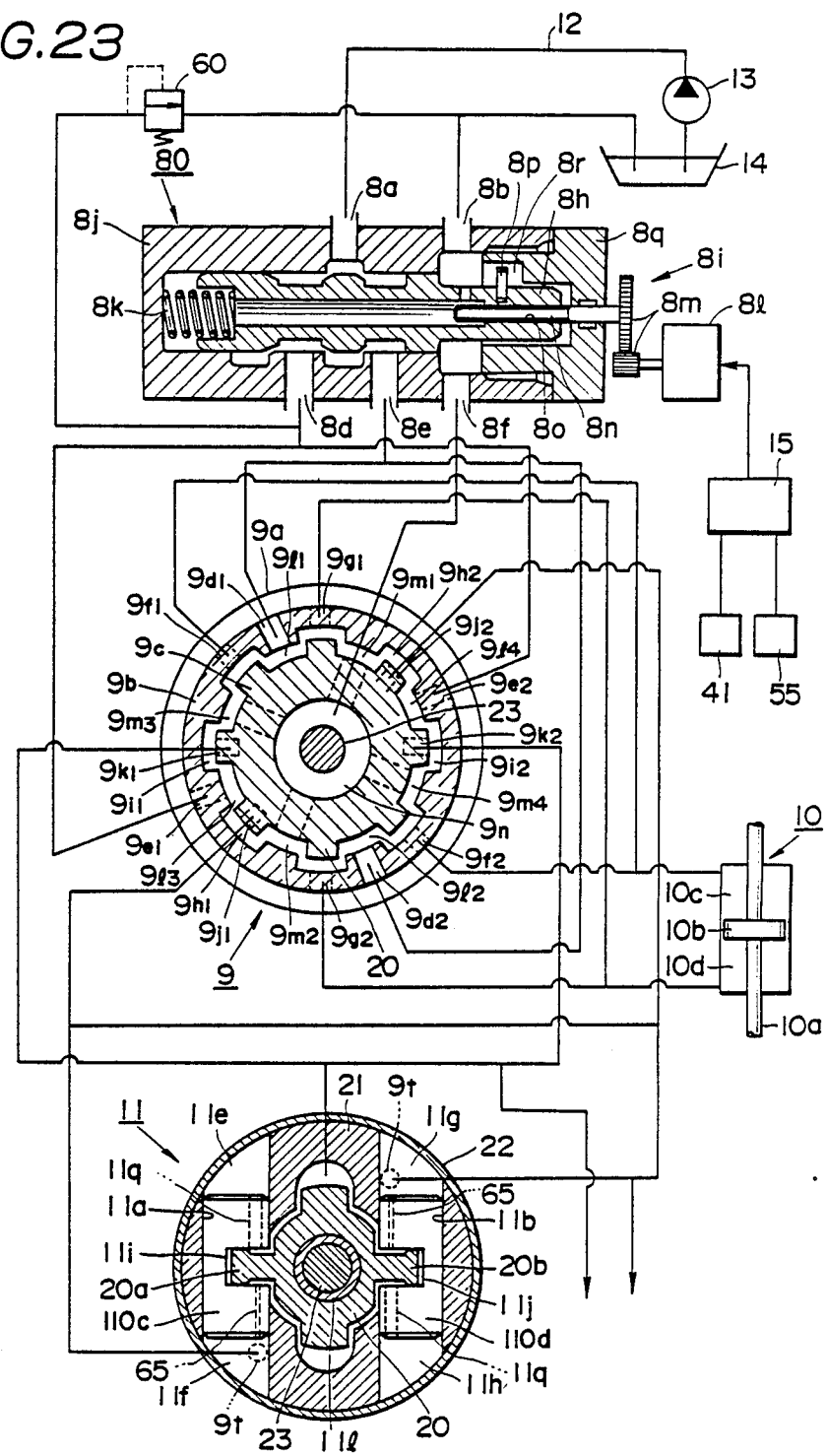
FIG. 23 is a cross-sectional view similar to FIG. 2 showing another embodiment of the present invention.

In this embodiment, as shown in FIG. 23, a spool 8h of the variable orifice valve 80 is actuated by a driving mechanism 8k which is controlled by a control signal from a control unit 15.

This driving mechanism 8k is composed of a stepping motor 8l rotationally driven by a pulse current from the control unit 15, a screw shaft 8n coupled to an output shaft of the stepping motor 8l through a reduction gear mechanism 8m, and a female screw 8o formed on the spool 8h engaging the threaded shaft 8n. On the other hand, the spool 8n has an engaging pin 8p protruding therefrom and the engaging pin 8p engages an engaging channel 8r extending axially and formed in the inner surface of a cover body 8q screwed in an opening end of a cylindrical valve housing 8j having a bottom wall, and thus the spool 8h is movable only in the axial direction. In this case, the control unit 15, in place of the circuit arrangement in FIG. 5, converts the output voltage of the frequency-voltage converting circuit 34 to a digital signal by an A/D converter, and supplies the digital signal to a signal processing circuit as a command position command value. In this signal processing circuit, a deviation between a present position and a command position is calculate, and pulse signals of a predetermined pulse number is outputted to the stepping motor 8l in order to move the spool 8h to the command position based on the deviation and referring to a pitch of the threaded shaft 8n. Thus, the stepping motor 8l is rotated by the predetermined rotation number in response to the pulse signals and the spool 8l is moved to the command position.

Furthermore, the drain port 8c and the variable orifice $A_0$ of the variable orifice valve 80 are omitted, and the discharge of the remaining working fluid by steering the steering wheel 1 at the time when the steering reaction force generating mechanism 11 is not operating, that is, when the vehicle is stopped or travelling at a low speed, such discharge being performed by the drain port 8c and the variable orifice $A_0$ in the previous embodiment, is designed in the present embodiment to be performed by fixed orifices 65 formed in control plungers 110c and 110d of the steering reaction force generating mechanism 11. In this respect, the discharge of the remaining working fluid is not limited to the use of the above-mentioned fixed orifices 65, and an orifice directly communicating from pressure chambers 11e to 11j to drain may be provided, and instead, a control valve of the type to interrupt the flow of liquid may be used in the rotary changeover valve 9.

Figure 24:
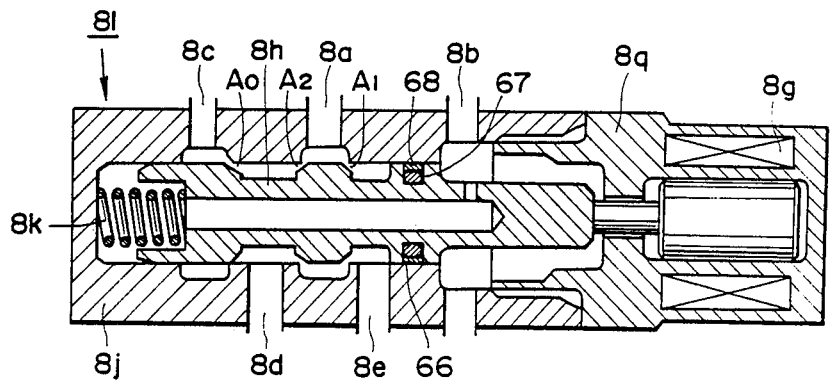
FIG. 24 is a cross-sectional view showing another embodiment of the variable orifice valve.

Next, another embodiment of the aforementioned variable orifice valve 81 will be described with reference to FIG. 24.

In this embodiment, an annular channel 66 is provided in the peripheral surface of a spool 8h between an input port 8a and a drain port 8b of a valve housing 8j, and within the annular channel 66, an O ring 67 is mounted on the inside and a resin ring 68 serving as a friction ring member is mounted on the outside, with the resin ring 68 pressingly in contact with the inner surface of the valve housing 8j. By such structure, it is possible to seal a very small gap between the spool 8h and the valve housing 8j at a position between the input port 8a and the drain portion 8b, and to prevent with certainty the generation of vibrations due to movement of the spool 8h, and at the same time, to prevent the leakage of the hydraulic fluid without failure.

We claim:

1. In a power steering system, which generates a steering assistance force and a steering reaction force in accordance with steering torque acting on an input shaft steering a vehicle, and which includes a control unit for setting a steering force based on a detective signal of detecting means for detecting a physical quantity factor which varies depending on a travelling condition and a steering condition of said vehicle, a steering force control device comprising:

a variable orifice valve for dividing a supply passage from a pump into first and second passages, respectively, for generating said steering assisting force and said steering reaction force, said variable orifice valve selecting a flow rate rates between said first and second passages in accordance with a control signal from said control unit, said variable orifice valve operating such that when a communicating area of one passage of said first and second passages increases, a communicating area of the the other passage decreases;

a passage changeover valve having first and second directional control valves formed in a common rotary valve having a spool interlocked to the input shaft and an outer sleeve secured to the steering members, said first and second directional control valves being connected to said first and second passages of said variable orifice valve, each of said first and second directional control valves changing over a working fluid under a unitary control in accordance with a direction and an amount of the steering torque acting on said input shaft;

a steering assisting force generating mechanism for generating a steering assistance force for said input shaft by the working fluid supplied from said second directional control valve of said passage changeover valve.

2. A system according to claim 1, wherein said variable orifice valve is a translation type spool valve having a spool slidably inserted into a valve housing, and said spool is driven by an electrically-driven driving mechanism.

3. A system according to claim 2, wherein said spool has an annular channel formed therein, and an O ring and a friction ring member are mounted in said annular channel so that said friction ring member is in contact with the inner surface of said valve housing.

4. A system according to claim 1, wherein said passage changeover valve has the first and second directional control valves formed in a common rotary valve having a spool interlocked to the input shaft and an outer sleeve secured to a steering member so that said first and second directional control valves are displaced angularly by 90° from each other.

5. A system according to any one of claims 1 to 4, wherein said steering reaction force generating mechanism includes control arms formed on said input shaft protruding from opposite sides thereof with respect to the axis of said input shaft, a pair of guide holes of an equal radius provided in said steering member at equal distance from the axis thereof and in parallel with each other, said guide holes being at one ends thereof respectively communicated with the output sides of said passage changeover valves, and control plungers having engaging cavity sections respectively fitted in said guide holes and engaging said control arms, and wherein said steering reaction force generating mechanism exerts a force couple by applying different fluid pressures respectively to opposite ends of each of said control plungers on said input shaft in an opposite rotational direction with respect to a steering direction.

6. A system according to claim 1, wherein said variable orifice valve includes first and second variable orifices formed between a valve housing and a spool to divide the supply passage into the two passages, and said spool movable in an axial direction under the control of said control unit so that when said spool moves in a direction to decrease a communicating area of one of said first and second variable orifices, a communicating area of the other of said variable orifices is increased.

7. A system according to claim 1, wherein said passage changeover valve includes an outer sleeve fixed to a steering member coupled to said input shaft through a resilient body, and includes a rotary sleeve formed integrally with said input shaft and fitted inside said outer sleeve; wherein a plurality of passages are formed in each of said outer sleeve and said rotary sleeve to define first and second directional control valves, said plurality of passages in said outer sleeve and said plurality of passages in said rotary sleeve in communication with each other through small opening areas at a neutral condition; and wherein said first directional control valve is inserted between one of the tow passages of said variable orifice valve and said steering assisting force generating mechanism, and said second directional control valve is inserted between the other of the two passages of said variable orifice valve and said steering reaction force generating mechanism.

8. In a power steering system which generates a steering assisting force and a steering reaction force in accordance with steering torque acted on an input shaft steering a vehicle, and which includes a control unit for setting a steering force based on a detection signal of detecting means for detecting a physical quantity factor which varies depending on a travelling condition and a steering condition of said vehicle, a steering force control device comprising:

a variable orifice valve for dividing a supply passage supplying a constant flow rate into two passages including first and second passages and for selecting a flow rate ratio between said first and second passages in accordance with a control signal from said control unit, said variable orifice valve operating synchronously so that a sum of areas varying respectively in said first and second passages is equal to or larger than a predetermined value;

a pair of passage changeover valves connected respectively to said first and second passages of said variable orifice valves for changing over the passages in accordance with the steering torque acting on said input shaft;

a steering assisting force generating mechanism for generating the steering assisting force for a steering member by the working fluid supplied from one of said passage changeover valves;

a steering reaction force generating mechanism for generating the steering reaction force for said input shaft by the working fluid supplied from the other of said passage changeover valves; and a drain passage having a valve portion connected to said second passage of said variable orifice valve for opening and closing in association with the operation of said variable orifice valve.

9. A system according to claim 8, wherein said variable orifice valve and said valve portion are formed in a translation type spool valve.

10. A system according to claim 9, wherein said translation type spool valve includes a spool having an annular channel formed around the peripheral surface, and an O ring and a friction ring member which is in contact with the inner surface of a valve housing are mounted in said annular channel.

11. In a power steering system which generates a steering assistance force and a steering reaction force in accordance with a steering torque acting on an input shaft steering a vehicle, and which includes a control unit for setting a steering force based on a detection signal of detecting means for detecting a physical quantity factor which varies depending on a travelling condition and a steering condition of said vehicle, a steering force control device comprising:

a variable orifice valve for dividing a supply passage from a pump into first and second passages, respectively, for generating said steering assistance force and said steering reaction force, said variable orifice valve selecting a flow rate ratio between said first and second passages in accordance with a control signal from said control unit, said variable orifice valve operating such that when a communicating area of one passage increases, a communicating area of the other passage decreases;

a passage changeover valve having first and second directional control valves formed in a common rotary valve having a spool interlocked to the input shaft and an outer sleeve secured to the steering member, said first and second directional control valves being connected to said first and second passages of said variable orifice valve, each of said first and second directional control valves changing over a working fluid under a unitary control in accordance with a direction and an amount of the steering torque acting on said input shaft;

a steering assistance force generating mechanism for generating a steering assistance force by the working fluid supplied from said first directional control valve of said passage changeover valve;

a steering reaction force generating mechanism for generating a steering reaction force for said input shaft by the working fluid supplied from said second directional control valve of said passage changeover valve; and a steering angle ratio varying mechanism including a resilient body interposed between said input shaft and said passage changeover valve, and including rotational displacement for said input shaft in a direction the same as the steering direction of said input shaft against torsional rigidity of said resilient body the working fluid supplied from said directional control valve of said passage changeover valve.

12. A system according to claim 11, wherein said resilient body is a torsion bar.

13. A system according to claim 11, wherein said variable orifice valve includes first and second variable orifices formed between a valve housing and a spool to divide the supply passage into the two passages, and said spool movable in an axial direction under the control of said control unit so that when said spool moves in a direction to decrease a communicating area of one of said first and second variable orifices, a communicating area of the other of said variable orifices is increased.

14. A system according to claim 11, wherein said passage changeover valve includes an outer sleeve fixed to a steering member coupled to said input shaft through a resilient body, and includes a rotary sleeve formed integrally with said input shaft and fitted inside said outer sleeve; wherein a plurality of passages are formed in each of said outer sleeve and said rotary sleeve to define said first and second directional control valves, said plurality of passages in said outer sleeve and said plurality of passages in said rotary sleeve in communication with each other through small opening areas at a neutral condition; and wherein said first directional control valve is inserted between one of the two passages of said variable orifice valve and said steering assisting force generating mechanism, and said second directional control valve is inserted between the other of the two passages of said variable orifice valve and said steering reaction force generating mechanism.

15. In a power steering system which generates a steering assisting force and a steering reaction force in accordance with steering torque acting on an input shaft steering a vehicle, and which includes a control unit for setting a steering force based on a detection signal of detecting means for detecting a physical quantity factor which varies depending on a travelling condition and a steering condition of said vehicle, a steering force control device comprising:

a variable orifice valve for dividing a supply passage supplying a constant flow rate into two passages and for selecting a flow rate ratio between said two passages in accordance with a control signal from said control unit, said variable orifice valve operating to increase a communicating area of one passage and to decrease a communicating area of the other passage so that a sum of the communicating areas in said two passages is at least equal to a predetermined value;

a passage changeover valve having first and second directional control valves connected respectively to said two passages divided from said supply passage said variable orifice valve, each of said first and second directional control valves changing over a working fluid in accordance with a direction and an amount of the steering torque acting on said input shaft;

a steering assisting force generating mechanism for generating a steering assisting force by the working fluid supplied from said first directional control valve of said passage changeover valve;

a steering reaction force generating mechanism for generating the steering reaction force for said input shaft by the working fluid supplied from said second directional control valve of said passage changeover valve;

a steering reaction force generating mechanism for generating the steering reaction force of said input shaft by the working fluid supplied from the said second directional control valve of said passage changeover valve; and hydraulic pressure regulating means for regulating a pressure of the working fluid supplied to said steering reaction force generating means.

16. A system according to claim 15, wherein said variable orifice valve is a translation type spool valve having a spool slidably inserted into a valve housing.

17. A system according to claim 16, wherein the spool of said translation type spool valve is coupled with a stepping motor driven in accordance with a detection result of said detecting means through a converting mechanism for converting a rotational force of said stepping motor to a linear driving force.

18. A system according to any one of claim 15 or 17, wherein said hydraulic pressure regulating means is a relief valve connected to a fluid supply passage between said variable orifice valve and said changeover valve.

19. In a power steering system which generates a steering assisting force and a steering reaction force in accordance with steering torque acting on an input shaft steering a vehicle, and which includes a control unit for setting a steering force based on a detection signal of detecting means for detecting a physical quantity factor which varies depending on a travelling condition and a steering condition of said vehicle, a steering force control device comprising:

a variable orifice valve for dividing a supply passage supply a constant flow rate into two passages and for selecting a flow rate ratio between said two passages by actuating an electromagnetic solenoid in accordance with a control signal from said control unit, said variable orifice valve operating to increase a communicating area of one passage and to decrease a communicating area of the other passage;

a passsage changeover valve having first and second directional control valves connected respectively to said two passages divided from said supply passage of said variable orifice valve for changing, each of said first and second directional control valves changing over the passages of working fluid in accordance with the steering torque acting on said input shaft; and a steering assisting force generating mechanism for generating the steering assisting force by the working fluid supplied from said first directional control valve of said passage changeover valve;

wherein said control unit includes:

frequency-voltage converting means for converting the detection signal of said detecting means to a voltage signal, means for generating a triangular wave, comparison means for comparing the output voltage of said frequency-voltage converting means with the output voltage of said triangular wave generating means, pulse width modulation means for supplying a pulse-shaped exciting current obtained from said comparison means to said electromagnetic solenoid, and voltage correcting means for correcting either one of the output voltages of said frequency-voltage converting means and said triangular wave generating so that a change in the exciting current due to an internal resistance change caused by a temperature change of said electromagnetic solenoid is suppressed.

20. A system according to claim 19, wherein said voltage correcting means includes a solenoid voltage correction means for performing the correction by suppressing the current change due to the internal resistance change caused by the temperature change of said electromagnetic solenoid, in accordance with the voltage signal of said frequency-voltage converting means, and wherein a peak value of the output of said triangular wave generating means is varied in accordance with a corrected voltage outputted from said solenoid voltage correction section.

21. A system according to claim 19, wherein said variable orifice valve includes first and second variable orifices formed between a valve housing and a spool to divide the supply passage into the two passages, and said spool movable in an axial direction under the control of said control unit so that when said spool moves in a direction to decrease a communicating area of one of said first and second variable orifices, a communicating area of the other of said variable orifices is increased.

22. A system according to claim 19, wherein said passage changeover valve includes an outer sleeve fixed to a steering member coupled to said input shaft through a resilient body, and includes a rotary sleeve formed integrally with said input shaft and fitted inside said outer sleeve; wherein a plurality of passages are formed in each of said outer sleeve and said rotary sleeve to define said first and second directional control valves, said plurality of passages in said outer sleeve and said plurality of passages in said rotary sleeve in communication with each other through small opening areas at a neutral condition; and wherein said first directional control valve is inserted between one of the two passages of said variable orifice valve and said steering assisting force generating mechanism, and said second directional control valve is inserted between the other of the two passages of said variable orifice valve and said steering reaction force generating mechanism.

* * * * *